United States Patent Office 3,801,559
Patented Apr. 2, 1974

3,801,559
POLY-1-CHLORO CYCLOOCTADIENE
Eilert A. Ofstead, Cuyahoga Falls, and Nissim Calderon, Akron, Ohio, assignors to The Goodyear Tire & Rubber Company, Akron, Ohio
No Drawing. Continuation of application Ser. No. 68,036, Aug. 28, 1970, which is a continuation-in-part of application Ser. No. 762,659, Sept. 25, 1968, which is a continuation-in-part of application Ser. No. 477,035, Aug. 3, 1965, which in turn is a continuation-in-part of application Ser. No. 448,872, Apr. 16, 1965, all now abandoned. This application July 31, 1972, Ser. No. 276,624
Int. Cl. C08f 5/00
U.S. Cl. 260—91.5
7 Claims

ABSTRACT OF THE DISCLOSURE

A method for the ring-opening polymerization of 1-chloro-1,5-cyclooctadiene is disclosed. The method comprises polymerizing 1-chloro-1,5-cyclooctadiene in the presence of a catalyst system comprising (A) at least one organometallic compound wherein the metal is selected from the group consisting of Ia, IIa, IIb and IIa of the Periodic Table of Elements, (B) at least one transition metal salt selected from the group consisting of tungsten and molybdenum halides and (C) at least one compound of the general formula R—Y—H wherein Y is oxygen; H is hydrogen and R is a radical selected from the group consisting of (1) hydrogen, (2) alkyl, (3) aryl, (4) arylalkyl, (5) alkaryl, (6) alkenyl, and (7) radicals of (2) through (6) wherein at least one hydrogen of the radical R may be substituted by at least one hydroxyl group; also a polymer consisting of repeating units having the formula

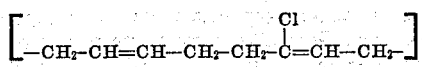

is disclosed.

---

This is a continuation of application Ser. No. 68,036 filed Aug. 28, 1970, and now abandoned, which is a continuation-in-part of application Ser. No. 762,659, filed Sept. 25, 1968, which is a continuation-in-part of application Ser. No. 477,035, filed Aug. 3, 1965, which in turn is a continuation-in-part of application Ser. No. 448,872, filed Apr. 16, 1965, now all abandoned.

This invention relates to a process for polymerizing 1-chloro-1,5-cyclooctadiene and to the perfectly alternating copolymer of butadiene-1,3-and chloroprene resulting therefrom.

The polymerization process of this invention may be used to prepare novel solid polymers. The properties and characteristics can be "tailor made" to fit a wide variety of uses and fields of application. The properties of the polymers resulting from the polymerization process of this invention can be varied over a wider range depending on (1) the particular substituted unsaturated alicyclic monomer chosen to be polymerized, (2) the particular polymerization catalyst employed, and (3) the particular polymerization conditions employed. The products resulting from the polymerization of this invention can be employed to produce finished rubber articles, molded goods and the like or they may be materials which are useful to manufacture articles such as films and fibers.

This invention comprises a polymer consisting of repeating units having the formula:

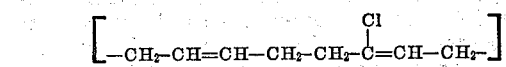

The polymer, as defined above, consists of two perfectly alternating units of butadiene-1,3 and chloroprene, the former consisting of 75–90% of the cis configuration and the latter being 100% of the cis configuration.

This invention also comprises polymerizing 1-chloro-1,5-cyclooctadiene by subjecting said 1-chloro-1,5-cyclooctadiene to polymerization conditions in the presence of a catalyst system comprising (A) at least one organometallic compound wherein the metal is selected from the group consisting of Ia, IIa, IIb and IIIa of the Periodic Table of Elements, (B) at least one transition metal selected from a group consisting of tungsten or molybdenum halides and (C) at least one compound of the formula R—Y—H wherein Y is oxygen and R is a radical selected from a group consisting of (1) hydrogen, (2) alkyl, (3) aryl, (4) arylalkyl, (5) alkaryl, (6) alkenyl and (7) radicals of (2) through (6) wherein at least one hydrogen of R may be substituted by at least one hydroxyl (OH) group.

The Periodic Table of Elements referred to above may be found in the Handbook of Chemistry and Physics, 44th edition, April 1962 reprinted, page 448, published by The Chemical Publishing Company, Cleveland, Ohio, U.S.A.

Representative examples of metals from which the organometallic compound, the first or (A) component of the catalyst system of this invention, can be derived are lithium, sodium, potassium, rubidium, cesium, beryllium, magnesium, calcium, strontium, barium, zinc, cadmium, aluminum, gallium, indium, and thallium. The preferred organometallic compounds are compounds of lithium, sodium, magnesium, aluminum, zinc and cadmium, with aluminum being most preferred.

Representative examples of organometallic compounds useful as the first or (A) catalyst component of this invention include aluminum compounds having at least one aluminum-carbon bond. Representative of such compounds are trialkylaluminums such as trimethylaluminum, triethylaluminum, tri-n-propylaluminum, tri-n-butylaluminum, triisopropylaluminum, triisobutylaluminum, trihexylaluminum, trioctylaluminum and the like; triarylaluminums such as tritolylaluminum, tribenzylaluminum, triphenylaluminum and the like; dialkylaluminum halides such as diethylaluminum chloride, di-n-propylaluminum chloride, diisobutylaluminum chloride, diethylaluminum bromide, diethylaluminum iodide, diethylaluminium fluoride and the like; mixtures of dialkylaluminum halides and alkylaluminum dihalides such as ethylaluminum sesquichloride and bromides may also be employed; alkylaluminum dihalides such as ethylaluminum dichloride, ethylaluminum dibromide, propylaluminum dichloride, isobutylaluminum dichloride, ethylaluminum diiodide and the like; dialkylaluminum hydrides such as diethylaluminum hydride, di-n-propylaluminum hydride, diisobutylaluminum hydride and the like; arylaluminum hydrides and dihydrides such as diphenylaluminum hydride and phenylaluminum dihydride; the arylaluminum dihalides such as phenylaluminum dibromide, tolylaluminum dibromide, benzylaluminum dibromide, phenylaluminum diiodide, tolylaluminum diiodide, benzylaluminum diiodide and the like; diarylaluminum halides such as diphenylaluminum chloride, ditolylaluminum chloride, dibenzylaluminum bromide and the like. Other metallic compounds are also useful in the practice of this invention. Representative of such organometallic compounds are organoalkali metal compounds such as alkyllithium compounds such as ethyllithium, n-butyllithium, t-butyllithium and the like; lithium-aluminum-tetraalkyls such as lithium-aluminum-tetrabutyl, lithium-aluminum-tetraethyl and the like; alkali metal alkyls and aryls such as amylsodium, butylpotassium, phenylpotassium, phenylsodium, phenyllithium, butyllithium and the like; magnesium alkyls and aryls such as diphenylmagnesium, diethylmagnesium, ethylmagnesium chloride, phenylmagnesium chloride, butylmagnesium bromide and the like; calcium, strontium, and barium organo compounds such as barium alkyls and aryls; alkyls and aryls of Group IIb metals such as diethylzinc, diphenylzinc, ethylzinc chloride, diethylcadmium, dibutylcadmium and the like; Grignard agents such as phenylmagnesium bromide may also be employed. Mixtures of these compounds may be employed as the first or (A) catalyst component in the catalyst of this invention. It is usually preferred to employ aluminum compounds such as trialkylaluminums, dialkylaluminum halides, alkylaluminum dihalides and aluminumsesquihalides.

Representative examples of the tungsten or molybdenum halides useful as the second or (B) catalyst component of this invention includes such compounds as molybdenum trichloride, molybdenum tetrachloride, molybdenum pentachloride, tungsten dichloride, tungsten tetrachloride, tungsten pentachloride, tungsten hexachloride, molybdenum dibromide, molybdenum tribromide, molydenum tetrabromide, tungsten dibromide, tungsten pentabromide, tungsten hexabromide, molybdenum hexafluoride, tungsten hexafluoride, tungsten diiodide, and tungsten tetraiodide. Of these it is usually preferred to employ tungsten halides representative of which is tungsten hexachloride.

Representative of the third or (C) catalyst component of this invention are compounds of the formula R—Y—H where Y is oxygen and R is a radical selected from a group consisting of (1) hydrogen, (2) alkyl, (3) aryl, (4) arylalkyl, (5) alkaryl, (6) alkenyl, and (7) radicals of (2) through (6) wherein at least one hydrogen of R may be substituted by at least one hydroxyl (OH) group.

Thus, the formula bove defines water (HOH), both saturated and unsaturated alcohols (ROH), hydroperoxides (ROOH) and polyalcohols (HOROH). Representative examples of the compounds corresponding to the formula above are alcohols such as methanol, ethanol, isopropanol, tertiarybutyl alcohol, amyl alcohol, benzyl, 1,1-dimethylbenzyl alcohol, phenol and the like; the hydroperoxides such as cumyl hydroperoxide, tertiarybutyl hydroperoxide and the polyalcohols such as ethylene glycol, glycerol and similar polyglycols such as catechol, resorcinol, hydroquinone, pyrogallol and the like. The preferred compounds of the general formula R—Y—H are the saturated alcohols represented by methanol, ethanol, isopropanol, tertiarybutyl alcohol and amyl alcohol. The most preferred compound is the saturated alcohol ethanol.

The catalysts employed in this invention are prepared by mixing the components by known techniques. Thus, the catalysts may be prepared by "preformed" or "in situ" techniques. By the "preformed" method the catalyst components are mixed together prior to exposure of any of the catalyst components to the monomer to be polymerized. In the "in situ" method the catalyst components are added separately to the monomer to be polymerized. The catalyst components may be mixed either as pure compounds or as suspensions or solutions in liquids which do not adversely affect polymerization.

While the presence of the monomer is not essential during the formation of active catalyst by a mixing of components B and C and this fact facilitates the use of "preformed" catalysts, it has been found that freshly preformed catalysts are generally more active than catalysts which have been allowed to age before use.

It has been found that good results are obtained in the practice of this invention when the molar relationship between the three catalyst components, A, B and C, as previously defined, are within a molar ratio of B/C ranging from about 0.3/1 to at least about 20/1 and the molar ratio of A/B is within the range of about 0.5/1 to at least 15/1. More preferred ratios are B/C of 0.5/1 to 5/1 and A/B of 0.5/1 to 8/1. Still more preferred ratios are B/C of 1/1 to 2/1 and A/B of 0.75/1 to 5/1.

The amount of catalyst employed in the polymerizations of this invention may be varied over wide concentrations and has not been found to be critical. Of course, a catalytic amount of the catalyst must be employed. The optimum amount of catalyst depends on a number of factors such as temperature, reactants used, purity of reactants, reaction times desired and the like. Those skilled in the art will readily determine the optimum catalytic ranges. Polymerizations can be conducted wherein the amount of catalyst employed is about 0.01 part by weight of B per 100 parts by weight of monomer employed with component A adjusted to yield a desirable atomic ratio of A to B.

The polymerizations of this invention may be conducted in solution. When the polymerization is carried out in solution, solvents which do not adversely affect the polymerization are desired. Representative examples of useful solvents include liquid aromatic hydrocarbons such as benzene and toluene; hydrogenated aromatic hydrocarbons such as Tetralin; liquid aliphatic hydrocarbons such as pentane, heptane, hexane, petroleum ether, decane; and alicyclic hydrocarbons such as cyclohexane, Decalin, and cyclooctane. Mixtures of such solvents may also be used.

Temperatures at which the polymerization reaction is carried out can be varied over a wide range. Usually the temperature can be varied from extremely low temperatures such as —60° C. up to high temperatures such as 150° C. or higher. Thus, the temperature is not a critical factor of the invention. It is generally preferred, however, to conduct the reaction at a temperature in the range of from about —20° C. to about 80° C. The pressure at which the polymerization is carried out can also be varied over a wide range. The reaction can be conducted at atmospheric pressure or, if desired, it can be carried out at sub-atmospheric pressure or super-atmospheric pressure. Generally, a satisfactory polymerization is obtained when the reaction is carried out at about autogenous pressure developed by the reactants under the operating conditions used.

The polymerization time will vary and can range from a few seconds to 24 hours or more, depending upon the polymerization conditions and the degree and extent of polymerization desired.

The polymerization reaction may be carried out as a batch or as a continuous process. In preforming the polymerizations of this invention, the introduction of the monomer, catalyst and solvent, when a solvent is employed, can each be made to the reaction zone alternately, intermittently and/or continuously.

It is thought that the polymerizations of this invention take place through a ring-opening polymerization mechanism. Such ring-opening polymerization of halogen-substituted unsaturated alicyclic compounds leads to interesting copolymers. Thus, 1 - chloro-1,5-cyclooctadiene would lead to a polymer equivalent to a perfectly alternating copolymer of butadiene-1,3 and chloroprene.

In these applications the monomer may be polymerized in the presence of one or more reinforcing carbon blacks, pigments or resins and certain antioxidants. The products made by this procedure may be cross-linked by adding polymerizable polyfunctional compounds, for example, bicyclopentadiene, to the main monomer. The molded products made by ring-opening polymerization may be crosslinked by exposure to ionizing radiation such as gamma rays, X-rays, or electrons. These molded products may also be crosslinked or vulcanized by incorporating certain compounds which, on heating during or subsequent to the polymerization, will lead to conventional crosslinking or vulcanization of these polymers.

The polymerization reaction may be terminated by incorporating various compounds which, upon heating, release materials which deactivate the catalyst. Representative examples of such compounds are the ammonia salts such as ammonium chloride, ammonium carbonate, ammonium acetate, ammonium oleate, ammonium sulfate and ammonium phosphate; other ammonia-releasing compounds such as tetraalkyl ammonium halides, e.g., tetramethyl ammonium chloride; water-releasing agents such as salts with water of crystallization, examples of which are: $Al_2(SO_4) \cdot 17H_2O$; $NH_4Al(SO_4) \cdot 12H_2O$; $FeSO_4 \cdot 7H_2O$; $MgHPO_4 \cdot 7H_2O$; $KAl(SO_4)_2 \cdot 12H_2O$; $KNaCO_3 \cdot 6H_2O$; $Na_2B_4O_7 \cdot 10H_2O$; $Na_2CO_3 \cdot 10H_2O$; $NaHPO_4 \cdot 12H_2O$; $Na_2SO_4 \cdot 10H_2O$; and $ZnNO_3 \cdot 6H_2O$.

The following examples are set forth to further illustrate the nature of this invention. However, it should be understood that the examples are set forth for illustrative and not for limitative purposes. The parts and percentages are by weight unless otherwise indicated. All experiments were conducted in an atmosphere of nitrogen unless noted.

EXAMPLE 1

A solution of 5.0 grams (gm.) of 1-chloro-1,5-cyclooctadiene and 5.0 milliliters (ml.) of dry benzene was charged into a dry 4-ounce bottle. Polymerization was affected by the addition of 0.75 ml. of a 0.05 molar (M) tungsten hexachloride ($WCl_6$)—ethanol solution in benzene followed by addition of 1.0 ml. of a 0.2 M ethylaluminum dichloride (EADC) solution in benzene. All manipulations involving the handling of monomer and catalyst were carried out under a nitrogen atmosphere. Polymerization was terminated after 5 minutes with methanol. The polymer was purified by coagulation from benzene with isopropanol yielding 1.4 g. or 28 percent by weight of a rubbery solid. The inherent viscosity of the rubbery solid was 1.45 deciliters per gram (dl./gm.) and the density was 1.09 grams per milliliter (gm./ml.). The Nuclear Magnetic Resonance (NMR) spectra confirms the proposed structure of a perfectly alternating copolymer of butadiene-1,3 and chloroprene. Infrared analysis indicated the presence of a cis-"neoprene" unit (850 cm.$^{-1}$) as well as transvinylene (965 cm.$^{-1}$), and cis vinylene (4710 cm.$^{-1}$).

EXAMPLE 2

A solution of 10.3 grams (gm.) of 1-chloro-1,5-cyclooctadiene and 40.0 milliliters (ml.) of dry benzene was charged into a dry 4-ounce bottle fitted with a self-sealing cap. Polymerization was affected by the addition of 0.05 M tungsten hexachloride ($WCl_6$)—ethanol solution in benzene followed by addition of 0.1 ml. of a 0.2 M ethylaluminum dichloride (EADC) solution in benzene. All manipulation involving monomer and catalysts were carried out under a nitrogen atmosphere. The resulting polymer was thoroughly intracted with a 1:1 benzene/methanol mixture and then dried yielding 4.54 gm. or 44 percent by weight of rubbery solid. The inherent viscosity was found to be 2.21 deciliters/gram (dl./gm.).

The polymers produced in accordance with this invention may be employed to manufacture various finished rubber articles, particularly industrial products rubber goods wherein good resistance to oils and greases is required and also where good resistance to oxygen and ozone attack are required. The polymers produced in accordance with this invention may be used as a substitute for polychloroprene or neoprene.

The polymers produced in accordance with ring opening polymerization of cycloolefins, particularly 1-chloro-1,5-cyclo-octadiene, result in perfectly alternating copolymers of repeating units of butadiene 1,3 and chloroprene.

By this is meant that the polymer has a structure which would appear as if this polymer had been derived by reacting one mole of butadiene with one mole of chloroprene followed by one mole of butadiene followed by one mole of chloroprene and so on. However, these polymers are not derived from a mixture of butadiene and chloroprene. These polymers are to be contrasted with the normal addition polymerization of conjugated diolefins, for instance, butadiene and/or chloroprene wherein the molecules of the butadiene and chloroprene enter into a random distribution along the polymer chain and are not perfectly alternating repeating units. This may be represented by the following equation wherein "B" represents butadiene and "C" represents chloroprene:

whereas a perfectly alternating, repeating polymer of this invention would be:

This perfectly alternating repeating configuration distinguishes the polymers of this invention from addition polymerization of mixtures of butadiene and chloroprene.

While certain representative embodiments and details have been shown for the purpose of illustrating the invention, it will be apparent to those skilled in the art that various changes and modifications may be made therein without departing from the spirit or scope of the invention.

What is claimed is:

1. A polymerization process comprising polymerizing 1-chloro-1,5-cyclooctadiene by subjecting said 1-chloro-1,5-cyclooctadiene to polymerization conditions in the presence of a catalyst system comprising:
    (A) at least one organometallic compound wherein the metal is selected from the group consisting of Groups Ia, IIa, IIb and IIIa of the Periodic Table of Elements found on page 488 of the Handbook of Chemistry and Physics, 44th edition, April 1962 reprinted, published by the Chemical Publishing Company, Cleveland, Ohio,
    (B) at least one transition metal salt selected from the group consisting of tungsten and molybdenum halides and
    (C) at least one compound of the general formula R—O—H, wherein R is a radical selected from the group consisting of (1) hydrogen, (2) alkyl, (3) aryl, (4) arylalkyl, (5) alkaryl, (6) alkenyl and (7) radicals of (2) through (6) wherein at least one hydrogen of the radical R is substituted by at least one hydroxyl (OH) group, in which the molar relationship among (A) (B) (C) are within a molar ratio of (B)/(C) ranging from about 0.3/1 to about 20/1 and the molar ratio of (A)/(B) is within the range of about 0.5/1 to at least 15/1, said catalyst system being employed in an amount of about 0.01 part by weight of component (B) per hundred parts by weight of said 1-chloro-1,5-cyclooctadiene, said polymerization being conducted at temperatures ranging from −60° C. to 150° C.

2. A process according to claim 1 in which the (A) organometallic catalyst component is an organoaluminum compound.

3. A process according to claim 1 in which the polymerization is conducted in solution.

4. A process according to claim 1 in which the transition metal salt, the (B) catalyst component, is a tungsten halide.

5. A process according to claim 1 in which the third or (C) catalyst component is a saturated aliphatic alcohol.

6. A process according to claim 1 wherein the molar ratio of (A)/(B) ranges from about 0.5/1 to about 8/1 and the molar ratio of (B)/(C) ranges from about 0.5/1 to 5/1.

7. A polymer consisting of repeating units having the formula:

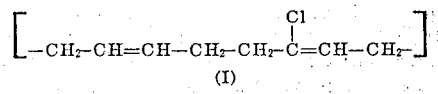

(I)

said portion of the repeating unit defined in Formula I as $$-CH_2-CH=CH-CH_2-$$

being of 75 to 90 percent of the cis configuration, said portion of the repeating unit defined in Formula I as

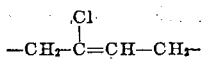

being 100 percent of the cis configuration.

References Cited
UNITED STATES PATENTS

| | | | |
|---|---|---|---|
| 2,417,034 | 3/1947 | Youker | 260—82.1 |
| 3,448,095 | 6/1969 | Dawans et al. | 260—82.1 |
| 3,459,725 | 8/1969 | Natta et al. | 260—93.1 |
| 3,481,895 | 12/1969 | Naarmann et al. | 260—82.1 |

HARRY WONG, JR., Primary Examiner

U.S. Cl. X.R.

204—159.14; 260—41 C, 82.1, 875